United States Patent [19]

Kashio

[11] 3,829,664

[45] Aug. 13, 1974

[54] NUMERICAL VALUE-RANKING APPARATUS

[75] Inventor: Toshio Kashio, Tokyo, Japan

[73] Assignee: Casio Computer Co., Ltd., Tokyo, Japan

[22] Filed: Dec. 26, 1972

[21] Appl. No.: 318,684

[30] Foreign Application Priority Data

Dec. 29, 1971 Japan .................................. 46-1452
Mar. 3, 1972 Japan .................................. 47-22087

[52] U.S. Cl. ...... 235/92 SH, 235/92 CA, 235/92 R, 340/146.2, 235/92 GA

[51] Int. Cl. ............................................. G06f 7/02

[58] Field of Search ...................... 340/146.2, 172.5; 235/92 CA, 92 SH, 92 NG, 92 GA

[56] References Cited

UNITED STATES PATENTS

| | | | |
|---|---|---|---|
| 3,479,644 | 11/1969 | Spaid | 340/146.2 |
| 3,517,175 | 6/1970 | Williams | 340/146.2 X |
| 3,740,538 | 6/1973 | Hemphill | 340/146.2 X |

*Primary Examiner*—Paul J. Henon
*Assistant Examiner*—Joseph M. Thesz, Jr.
*Attorney, Agent, or Firm*—Flynn & Frishauf

[57] ABSTRACT

A numerical value-ranking apparatus comprising a first shift register for linearly storing a plurality of input numerical data items whose ranks are to be determined and for circulatingly shifting the data items; and a second shift register for reading out one item of the data stored in the first register and circulatingly shifting said item in synchronization with shifting in the first shift register, wherein the items which are stored in the first shift register and which are not read out to the second register are compared in succession with said one item as a reference by a comparator. The comparator generates an output signal each time there is detected any of the items which has a specific numerical relationship with said reference item; the number of times said output signal is generated is counted by a counting means; and the count thus obtained is indicated or recorded for the ranking of said reference item.

5 Claims, 6 Drawing Figures

| ADDRESS | SCORE | RANK |
|---|---|---|
| 1 | 185 | 2-3 |
| 2 | 204 | 1 |
| 3 | 150 | 5 |
| 4 | 185 | 2-3 |
| 5 | 175 | 4 |

NUMERICAL VALUE-RANKING APPARATUS

BACKGROUND OF THE INVENTION

This invention relates to a numerical value-ranking apparatus. Where a number of persons play, for example, bowling or golf, it is necessary to rank the scores obtained by the players. The operation of ranking players' scores is complicated and consumes a great deal of time, often giving rise to errors. The ranking of numerical data is generally required to figure out not only the results of games but also business records. It is preferred, however, that such ranking be carried out by an inexpensive counting apparatus which is easy to handle.

It is accordingly an object of this invention to provide an inexpensive numerical value-ranking apparatus which is easy to handle and which can effect the ranking of numerical data items simply by being supplied with the data items to be ranked.

Another object of the invention is to provide a numerical data-ranking apparatus which further includes a summing means for adding up originating data to obtain the data items which are going to be ranked.

SUMMARY OF THE INVENTION

A numerical data-ranking apparatus according to this invention comprises a first shift register for linearly storing a plurality of input data items to be ranked and shifting them by circulation; a second shift register for reading out one item of the data previously stored in the first register to temporarily store it and for circulatingly shifting it in synchronization with the shifting in the first shift register; a comparator for successively comparing the items which are stored in the first shift register and which were not read out to the second shift register with said one item used as a reference and for generating an output signal each time there is detected any of the items which has a specific numerical relationship with said reference item; a counting means for counting the number of times there is produced an output signal from the comparator; and a means for indicating or recording the outputs of the counting means.

The apparatus of this invention is inexpensive and easy to handle and can effect the ranking of numerical data simply by causing data items to be stored in a first shift register. Where it is desired to obtain a sum of original data for storing a plurality of the sums in the first shift register for ranking each sum, it is possible additionally to provide a device for adding up said original data. Further to meet the cases where the items having larger numerical values stored in the first shift register occupy higher ranks and where the items having smaller numerical values stored therein represent higher ranks, then there may be used a rank-reversing circuit to broaden the application of the present apparatus. Where the data stored in the first shift register contain some items having an equal value to that which is stored as a reference in the second shift register, the present apparatus can determine the collective rank of such equal items including said reference item taken as a group.

DESCRIPTION OF THE PREFERRED EMBODIMENTS

Figure 1:
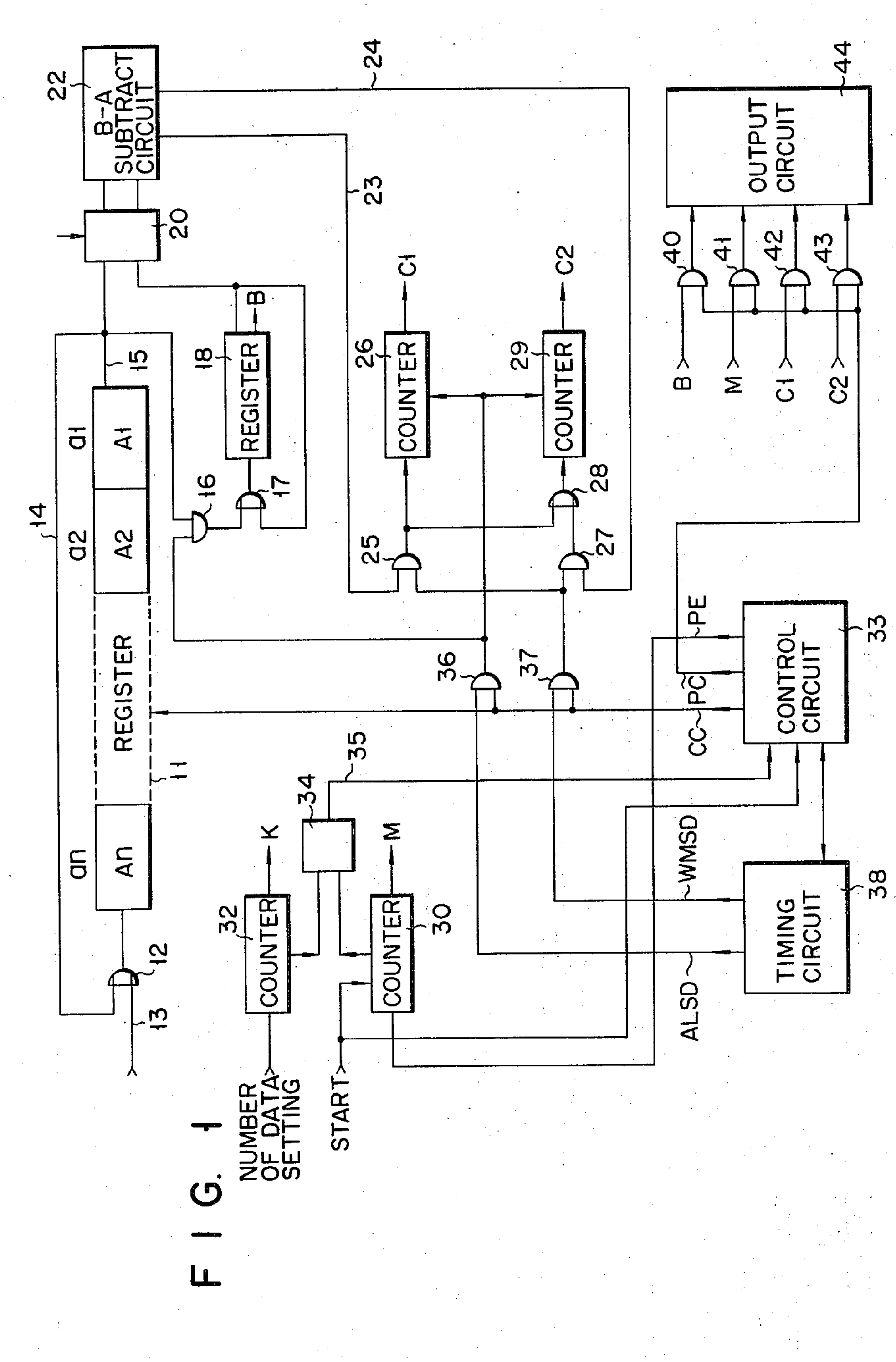
FIG. 1 is a block circuit diagram of a score-ranking apparatus according to an embodiment of this invention.

Referring to FIG. 1, a first shift register 11 is supplied through the input terminal 13 of an OR circuit 12 with data consisting of a plurality of scores whose ranks are to be determined. Let the addresses of the first shift register 11 be denoted by *al* to *an* and the scores stored in said addresses by Al to An. The first shift register 11 has a circulatory shifting circuit 14 including the OR circuit 12, in which the respective scores are subjected to circulatory shifting. Now let it be assumed that the scores Al to An represent the scores obtained by bowling players. In this case, the addresses of the first shift register 11 are specified for the respective players and their scores are supplied to the corresponding addresses through a keyboard (not shown). To the output terminal 15 of the first shift register 11 is connected a second shift register 18 through an AND circuit 16 and OR circuit 17. This second shift register 18 has a capacity to store only one of the scores previously stored in the first shift register 11. Now let said one score be denoted by B. This score B is also subjected to circulatory shifting through a circuit 19 and said OR circuit 17 in synchronization with shifting in the first shift register 11. Let the scores read out from the first shift register 11 be collectively designated by A. These scores A and B are conducted to a subtraction circuit 22 through the later described rank-reversing circuit 20. In the case of a bowling game, the rank-reversing circuit 20 is so operated as to carry out a subtraction of B − A. This circuit 20 generates a borrow signal 23 where B − A represents a negative value, and a zero detection signal 24 where B − A denotes zero. The borrow signal 23 is supplied to a first counter 26 through an AND circuit 25 and the zero detection signal 24 to a second counter 29 through an AND circuit 27 and OR circuit 28. An output from the AND circuit 25 is conducted to the second counter 29 through the OR circuit 28.

Those of the scores stored in the first shift register which are not read out at present are compared with the referential score. There are further provided a counter 30 for counting the number of cycles of comparison (one cycle of comparison is herein defined to mean the comparisons of all said scores which are not read out at present in the second register with the referential one, and in consequence the total number of comparison cycles corresponds to the number of scores stored in the first shift register 11) and a counter 32 for storing the preset number of scores stored in the first shift register 11. Said comparison cycle counter 30 is reset by a start signal shown in FIGS. 2 — 1 and, when the shifting of scores stored in the first shift register 11 completes one cycle, counts the number of pulse signals PE (FIGS. 2 — 6) supplied from a control circuit 33. Outputs from the counter 32 stored with the above-mentioned preset number of scores and those from the comparison cycle counter 30 are always compared in a coincidence circuit 34. Where outputs from both counters 30 and 32 agree with each other, the control circuit 33 is supplied with an end pulse 35. The start signal FIGS. 2 — 1) is also conducted to the control circuit 33 which generates a signal CC (FIGS. 2—2) for causing the scores stored in the first shift register 11 to be shifted. Said shift signal CC is carried not only to the first shift register 11 but also to AND circuits 36 and 37. When one score, for example, Al stored in the first shift register 11 is brought to the output terminal 15 of said shift register 11, then a signal ALSD (FIGS. 2 — 4) produced from a timing circuit 38 is supplied to the AND circuit 36. Said signal ALSD resets or clears the first and second counters 26 and 29. Further, a signal WMSD FIGS. 2 — 5) generated by the timing circuit 38 in synchronization with the shifting of the respective scores in the first shift register 11 is conducted to the AND circuit 37. An output from the AND circuit 37 is supplied to the AND circuits 25 and 27 to act as a gating signal for supplying the borrow signal 23 and zero detection signal 24 to the corresponding counters 26 and 29. After generation of a signal CC, the control circuit 33 produces a signal PC FIGS. 2 — 3), which is supplied to the AND gates 40, 41, 42 and 43 as a gating signal. As the result, the referential score B stored in the second shift register 18, a count M given by the comparison counter 30, a count C1 shown by the first counter 26 and a count C2 produced by the second counter 29 are all carried to an output device 44. All these counts are indicated or recorded as the occasion demands.

Figure 2:
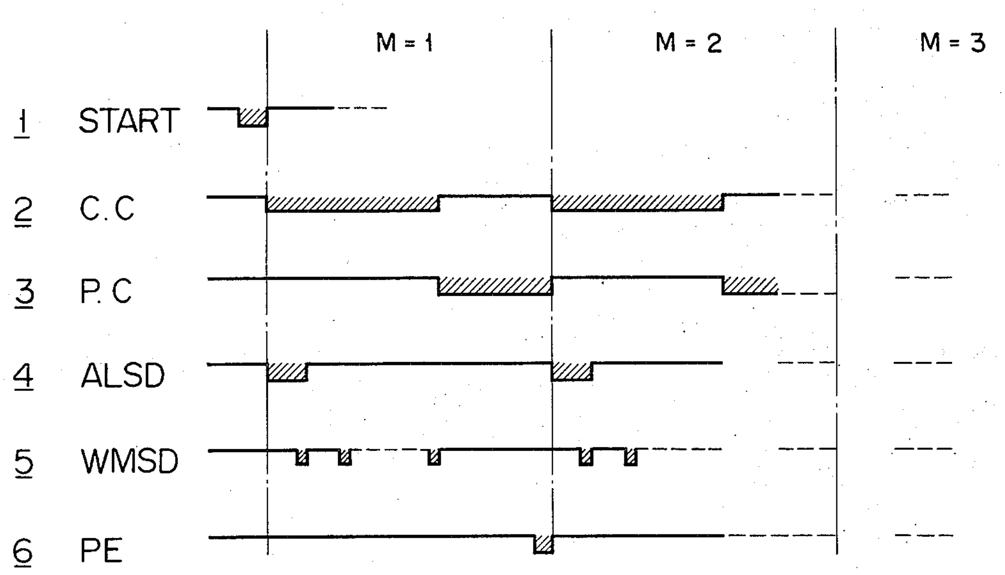
FIG. 2 presents the wave forms of control signals by way of illustrating the operation of the apparatus of FIG. 1.

There will now be described the operation of the above-mentioned score-ranking apparatus of this invention. Let it be assumed that ten scores whose ranks are to be determined are stored in the first shift register 11 through the OR circuit 12. The counter 32 for storing the preset number of scores is set at 10. When a start signal (FIGS. 2 — 1) is supplied to the comparison cycle counter 30 and control circuit 33, said comparison cycle counter 30 is reset and the control circuit 33 supplies a signal CC (FIGS. 2 — 2) to the first shift register 11 to cause the scores stored therein to be shifted toward the right as indicated in FIG. 2 to an extent corresponding to one score. At this time, the timing circuit 38 supplies a signal ALSD (FIGS. 2 — 4) to the first and second counters 26 and 29 through the AND circuit 36 to reset these counters 26 and 29. An output from the AND circuit 36 is also conducted as a gating signal to the AND circuit 16 to open it. Accordingly, a score, for example, A1 stored in the first shift register 11 is brought to its output terminal and then read out through the OR circuit 17 to be stored in the second shift register 18. The score thus stored in the second shift register 18 is designated by B when read out therefrom. The score B is taken as a reference and compared in the subtraction circuit 22 with the scores which are not read out at present as a reference, for example, A2 to An stored in the first shift register 11 and read out therefrom so as to determine the rank of said referential score B among the preset number (for example, 10) of the scores.

In the case of a bowling game where larger scores assume higher ranks, it is only required to detect the scores which will occupy higher ranks than the referential score B. To this end, therefore, the rank-reversing circuit 20 is so set as to cause a subtraction of B-A to be carried out in the subtraction circuit 22. A borrow signal 23 which is generated each time a larger score than the referential score B is read out from the first shift register 11, passes through the AND circuit 25 gated by an output from the AND gate 37 which in turn is gated by a signal WMSD supplied from the timing circuit 38 each time any of the scores of the first shift register 11 is shifted. Thereafter the number of times said borrow signal 23 is generated is counted by the first counter 26 to determine the rank which the referential score B occupies with respect to the scores which are not read out at present from the first shift register 11. Outputs from the AND circuit 25 are supplied to the second counter 29 through the OR circuit 28 to have their number counted. The second counter 29 also counts the number of times a zero detection signal 24 is delivered from the subtraction circuit 22. Namely, where the first shift register 11 stores some scores equal to the referential score B, the second counter 29 counts the number of said equal scores. The count given by the second counter 29 in this case can be used in determining the collective rank of said referential score when scores of the same value as that of the referential score are included in the first shift register. For example, where the first counter 26 counts "2" as the number of larger scores than the referential score B, and the second counter 29 counts "4" as the number of scores consisting of scores larger than, and equal to, the referential score B (in this case, the counts "2" and "4" include the number 1 which is always counted up in advance by these counters 26 and 29 when they are in a reset condition), then the referential score B is shown to assume the second to fourth rank among all the scores stored in the first register 11. In other words, the scores bearing the second to fourth collective rank are the same as the referential score B. As above mentioned, it should be noted that since the counts C1 and C2 given by the first and second counters 26 and 29 respectively are intended to determine the rank of the referential score B, it is necessary for the counters 26 and 29 to count in advance the number 1 respectively when they are reset.

When the scores which are not read out at present in the second shift register 18 are all compared with the referential score B, for example, a score A1 stored in the second shift register 18, then said referential score Al has its rank determined, as mentioned above, from the counts given by the first and second counters 26 and 29. Under this condition, the comparison cycle counter 30 counts "1" upon receipt of a signal PE (FIGS. 2 — 6) from the control circuit 33 and generates a signal M showing that the referential score B was stored in the first address (or address al) of the first shift register 11, namely, a signal indicating said address al. Upon arrival of a signal PC (FIGS. 2 — 3) from the control circuit 33, the referential score B, the signal M denoting its address and the counts C1 and C2 given by the first and second counters 26 and 29 are all conducted to the output device 44 where they are indicated or recorded.

Where a score stored in, for example, the first address or address *al* of the first shift register 11 has its rank determined in the aforesaid manner, the signal ALSD is again supplied to the first and second counters 26 and 29 to reset them. At this time, a score A2 stored in the second address or address *a2* and shifted to the output terminal 15 of the first shift register 11 is now read out to the second shift register 18 as a new referential score B. Thereafter, the rank of the new referential score B or score A2 is determined through the above-mentioned process, and indicated or recorded by the output device 44. The comparison cycle counter 30 counts 2 and generates a signal "2" showing the address of the second referential score B or score A2. When all the scores have their ranks determined, the count K (for example, 10) representing the preset number of scores at which the score number-storing counter 32 was originally set agrees with the count given by the comparison cycle counter 30. Accordingly, the coincidence circuit 35 supplies an end pulse 35 to the control circuit 33, thus completing the score-ranking operation.

Figure 3:
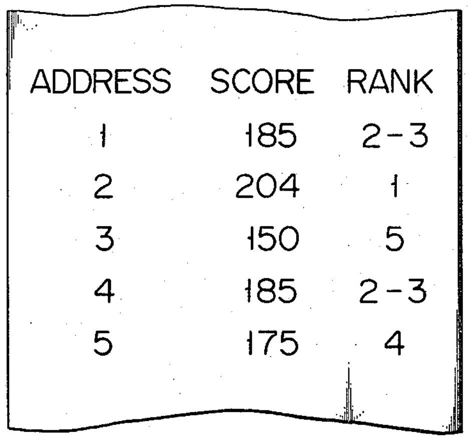
FIG. 3 shows a form in which there are indicated the ranks of scores obtained from the output generator of FIG. 1.

FIG. 3 relates to the case where a bowling game was played by five persons and the scores of the respective players stored in the first to fifth addresses had their ranks determined by the apparatus of this invention arranged as described above and the ranks thus determined are recorded by the output device 44.

In the case of a golf game, for example, where smaller scores occupy higher ranks contrary to the bowling game where larger scores take higher ranks, the rank-reversing circuit 20 is so set as to cause a subtraction of A—B to be carried out in the subtraction circuit 22. Then the ranks of golf scores can be determined through exactly the same process as in the bowling game.

Figure 4:
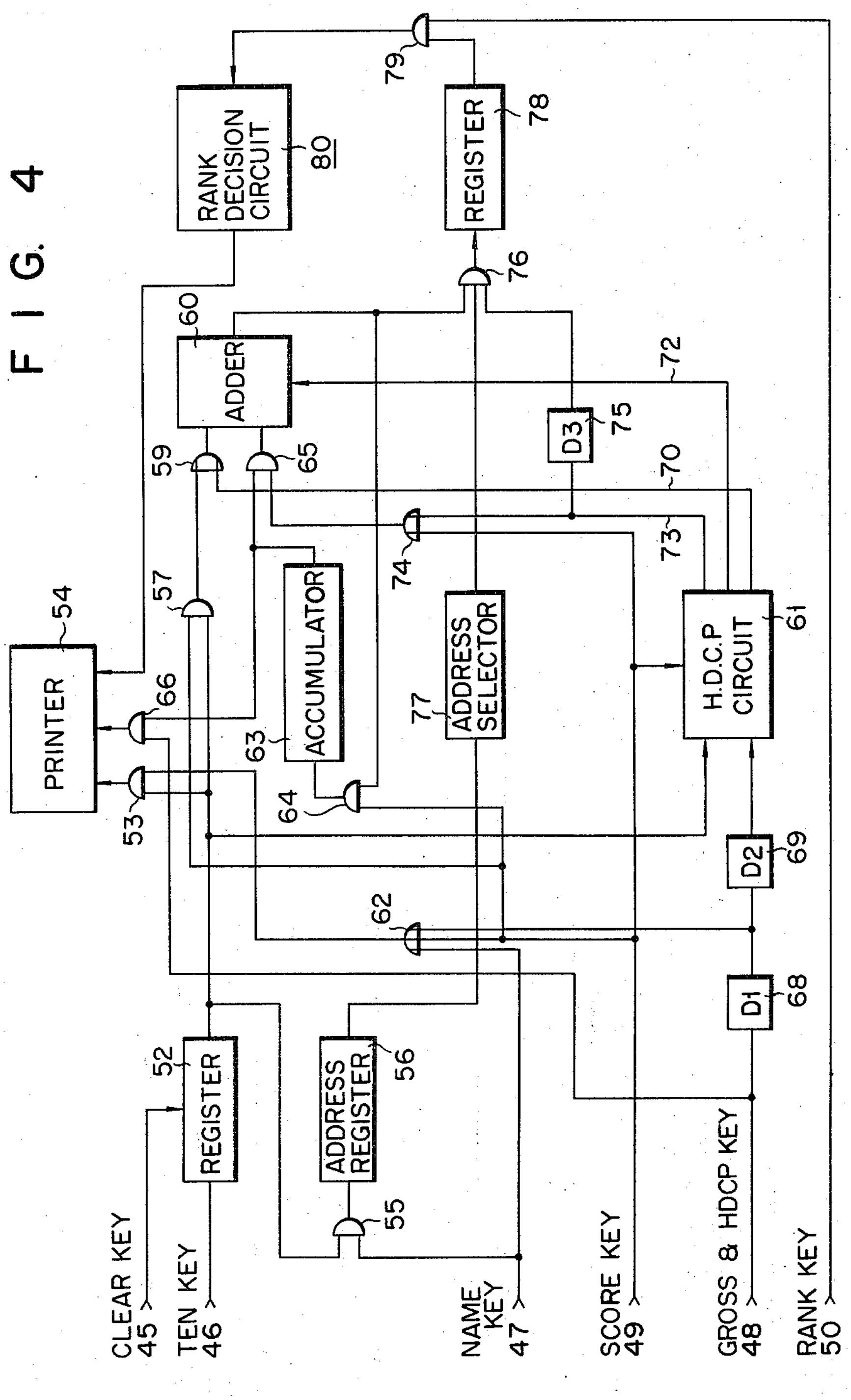
FIG. 4 is a block circuit diagram of a score-ranking apparatus according to another embodiment of the invention applied for the ranking of scores obtained in a golf game.

FIG. 4 presents a block circuit diagram of a score-ranking apparatus according to another embodiment of this invention used in a golf game. According to this apparatus, there are recorded the scores obtained by the respective players for each half round of game, a sum of each player's half score, his handicap and final ranks of all the players. Since, in the golf game, the ranks of the individual players are determined after summing up each player's scores for each half round of game, said determination is considerably time-consuming. However, the apparatus according to the embodiment of FIG. 4 attains the quick, accurate ranking of the players' scores.

Figure 5:
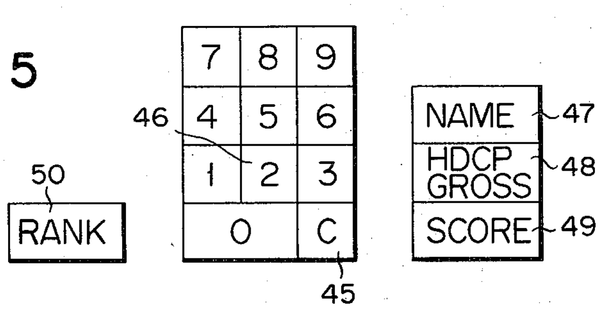
FIG. 5 is a plan view of an input keyboard used in the apparatus of FIG. 4.

There will now be described the operation of the apparatus having the circuit arrangement of FIG. 4. For its operation, there is provided a keyboard including, as shown in FIG. 5, a clear key 45, ten keys 46, name key 47, handicap-gross key 48, score key 49 and rank key 50. After emptied of stored data by the clear key 45, a buffer register 52 is stored in succession with the address of each player and his score by operation of the ten keys 46. A signal read out from the buffer register 52 is supplied through an AND circuit 53 to a printer 54 and also to an address register through an AND circuit 55. The AND circuits 53 and 55 are gated by a command signal delivered by operation of the name key 47. An output signal from the buffer register 52 is also conducted to an adder 60 and handicap counting circuit 61 through an AND circuit 57 and OR circuit 59. The AND circuit 57 is gated by a command signal from the score key 49. The command signal from the score key 49 is conducted to the AND circuit 53 as a gating signal through an OR circuit 62, to the handicap counting circuit 61 as a signal for commanding the number of times the handicap is to be added, and as a gating signal to an AND circuit 64 for supplying an output from the adder 60 to an accumulator 63. An output signal from the accumulator 63 is supplied to the adder 60 through an AND circuit 65 and also to the printer 54 through an AND circuit 66 supplied with a gating signal from the gross key 48.

The handicap counting circuit 61 is supplied with a command signal from the handicap key 48 (concurrently acting as a gross key) through delayed flip-flop circuits 68 and 69. An output data signal 70 from the handicap counting circuit 61 is conducted to the adder 60 through the OR circuit 59. A signal 72 commanding an arithmetic operation is supplied to the adder 60. An end pulse 73 generated upon completion of counting by the handicap counting circuit 61 is carried to the AND circuit 65 as a gating signal through an OR circuit 74 which is supplied with a signal from the score key 49, and also to an AND circuit 76 as a gating signal through a delayed flip-flop circuit 75. The input terminal of the AND circuit 76 is supplied with an output score signal from the adder 60 and an address specifying signal from an address selecting circuit 77 for selecting an address by a command signal from the address register 56. Accordingly, a total register 78 is stored with an output score signal from the adder 60 with its address specified. A signal read out from the total register 78 is supplied to a score-ranking circuit 80 through an AND circuit 79 gated by a command signal from the rank key 50 for the ranking of scores. Signals denoting the ranks of scores are conducted to the printer 54 so as to print said ranks. The total register 78 corresponds to the first shift register 11 of FIG. 1 and the printer to the output device 44 of FIG. 1.

Figure 6:
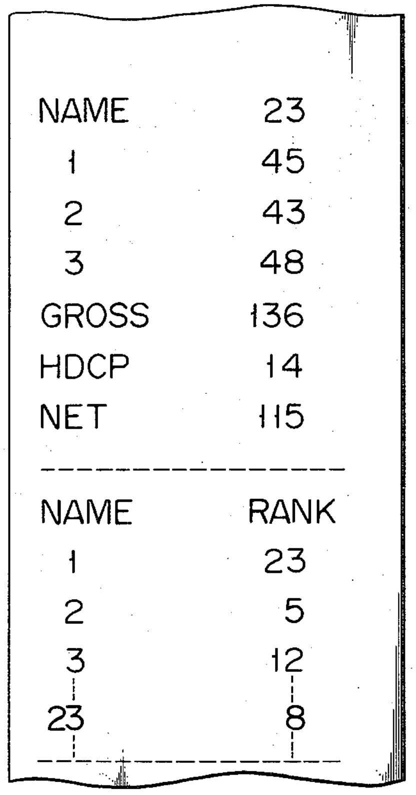
FIG. 6 shows a form in which there are indicated the ranks of scores recorded by a printer included in the apparatus of FIG. 4.

There will now be described the embodiment of FIG. 4 by reference to FIG. 6 which presents the golf scores recorded by operation of said embodiment.

A player's address, for example, "23" is stored in the buffer register 52 by operation of the ten keys 46. Next the name key 47 is operated to open the AND circuits 53 and 55, causing the address number "23" to be printed by the printer 54 and stored in the address register 56. A score corresponding to said address number is supplied to the buffer register 52 by operation of the ten keys 46. Now let it be assumed that a golf game of one round and a half was played. Since one round consists of two half-rounds, a golf game of three half-round is supposed in this case to have been played. Therefore, the buffer register 52 is supplied with each player's scores for three half-rounds by operation of the score key 49. Thus, as shown in FIG. 6, the scores of a player bearing, for example, the address number "23" for three half-rounds "1," "2" and "3" are recorded below said address number "23." These scores are also supplied through the AND circuit 57 and OR circuit 59 to the adder 60 where said scores are added to the data supplied from the accumulator 63 through the AND circuit 65. A sum of added scores is stored in the accumulator 63 through the AND circuit 64. Namely, the accumulator 63 gives the total of the above-mentioned player's scores for three half-rounds. The total is conducted to the printer 54 through the AND gate 66 gated by a command signal from the gross key 48 and recorded as a gross value.

For computation of golf scores, players' handicaps should be taken into account. These handicaps are supplied to the handicap counting circuit 61 through the buffer register 52 by operation of the ten keys 46 as in the case of scores. A score for each half-round is supplied to the accumulator 63. In this case, a handicap of "14" (assuming that a given player's handicap for one round is "14") is supplied to the buffer register 52. In this case, therefore, a handicap of "7" has only to be allotted for each half-round.

At this time, there is counted the number of times the half-round scores were supplied to the adder 60 by operation of the score kay 49. Therefore, the aforesaid handicap "7" for each half-round is added in the handicap counting circuit 61 as often as the half-round scores were supplied to the adder 60 by operating the key 49. Namely, where the scores obtained by a player having a handicap of "14" by playing a golf game for one round and a half are supplied to the buffer register 52, then a total handicap of "21" (7 × 3) is set in the handicap counting circuit 61. Under such arrangement, a command signal from the handicap key 48 opens the AND circuit 66 to record the stored handicap in the buffer register 52. The gross key 48 and handicap key 48 are used concurrently. Where, therefore, the gross key 48 is operated after the buffer register 52 is supplied with a handicap, then the printer 54 records a gross and then the handicap at an interval defined by the delayed flip-flop circuit 68. A command signal generated from the handicap key 48 at an interval further delayed by the second delayed flip-flop circuit 69 is supplied to the handicap counting circuit 61, which in turn produces an output 70 representing a handicap of "21" (assuming that one round and a half of a golf game is played with a handicap of "14"). At this time, said handicap counting circuit 61 also gives a command 72 for subtraction of "21" to the adder 60. The end pulse 73 generated upon completion of counting by the handicap counting circuit 61 opens the AND circuit 65 to cause a signal of a gross to be supplied from the accumulator 63 to the adder 60 where there is operated an arithmetic operation to obtain a net score. Said net score which is associated with a player bearing the address "23" passes through the AND circuit 76 gated by the end pulse 73 generated at an interval delayed by the third delayed flip-flop circuit 75 according to an address-specifying signal from the address selecting circuit 77, and is finally stored in the total register 78.

Where the buffer register 52 is supplied with the scores of a plurality of players together with their addresses by operation of ten keys 46, then there are recorded the players' half-round scores, gross scores handicaps and net scores. The net scores are finally stored in the total register 78. Thereafter it is only required to determine the ranks of the respective players based on their net scores. When, therefore, the rank key 50 is operated to open the AND circuit 79, then the players' net scores stored in the total register 78 are read out to the score-ranking circuit 80 in the order of the players' addresses, thereby defining the ranks which the players' net scores occupy among those stored in the total register 78. An output from the score-ranking circuit 80 is conducted to the printer 54 where the aforesaid ranks are recorded. The principle on which there is based the ranking of scores effected by said score-ranking circuit 80 has already been detailed in connection with the embodiment of FIG. 1, further description being omitted.

Where applied in the ranking of bowling scores, the apparatus of this invention can record a player's score for a single round of game as well as a sum of his scores for a series of games. Where a given player is allowed a handicap, it is only required to supply a command for addition of said handicap from the handicap counting circuit 61 to the adder 60. The present apparatus is also applicable in ranking a plurality of sums arrived at by adding up the numbers included in each of various groups or categories. The handicap counting circuit 61 may be omitted or set at zero, as occasion demands. Further, said handicap circuit 61 itself may be used as a means for correcting a gross sum of the numbers belonging to each of various groups or categories, in case a correcting value has to be deducted from, or added to, any of said gross sums due to a handicap being allowed therefor.

What is claimed is:

1. A numerical value-ranking apparatus comprising:

a first shift register for linearly storing a plurality of input numerical data items whose ranks are to be determined, and for circulatingly shifting said data items;

a second shift register coupled to said first shift register for receiving a data item stored in said first shift register and read out from an output terminal of said first shift register and for temporarily storing the read out data item and circulatingly shifting the read out data item in synchronization with the shifting in said first shift register;

a comparator coupled to said first and second shift registers for comparing (1) the items which are stored in said first shift register and which were not read out from said first shift register to said second shift register with (2) said one item stored in said second shift register as a reference, and generating an output signal each time there is detected any of said items which has a given numerical relationship with said reference item;

means coupled to said comparator for counting the number of times said comparator generates an output signal;

means coupled to said counting means for indicating or recording the count output given by said counting means as the value-ranking of the item read out to the second register with respect to all data stored in said first register; and control means coupled to said first and second shift registers for causing selected data items to be shifted from said first shift register to said second shift register for indicating or recording the value-ranking of the selected items of the remaining data in said first register by conducting the same operations as aforesaid.

2. The numerical value-ranking apparatus according to claim 1 wherein:

said comparator includes first means for producing a first output signal each time there is detected an item having a given numerical relationship with said reference item; and a second means for generating a second output signal each time there is detected an item equal to said reference item; and said counting means includes a first counter for counting the number of times said first output signal is generated by said first means; and a second counter for counting the number of times said second output signal is produced by said second means.

3. The numerical value-ranking apparatus according to claim 2 wherein said comparator includes a subtraction circuit for carrying out subtraction by comparing said reference item with said data items which are not read out from said first shift register to said second shift register, said subtraction circuit producing a borrow signal as said first output signal when any of said not read out data items is larger than said reference item, and generating a zero signal as said second output signal when a balance arrived at by said subtraction is zero.

4. The numerical value-ranking apparatus according to claim 1 wherein said comparator includes:

a subtraction circuit for carrying out subtraction by comparing said reference item with said data items which are not read out from said first shift register to said second register; and a rank-reversing means receiving the outputs of said first and second shift registers for selectively reversing the positions of a subtrahend and minuend and supplying the resultant outputs thereof to said subtraction circuit.

5. A numerical value-ranking apparatus comprising:

a shift register for storing an address and items of data associated with said address whose rank is to be determined;

means for recording the address and items stored in said shift register;

arithmetic operation means coupled to said recording means for summing up the items recorded for each address;

a first shift register for linearly storing the sums of items obtained by said arithmetic operation means for respective addresses and for circulatingly shifting said sums;

a second shift register coupled to said first shift register for receiving one of the stored sums from an output terminal of said first shift register and for temporarily storing the received sum and circulatingly shifting said stored sum in synchronization with the shifting in said first shift register;

comparing means coupled to said first and second shift registers for comparing (1) the sums which are stored in said first shift register and which were not read out from said first shift register to said second shift register with (2) a sum stored in said second shift register with the latter sum taken as a reference, and generating an output signal each time there is detected any of said sums which has a given numerical relationship with said reference sum;

means coupled to said comparing means for counting the number of times said comparing means generates an output signal;

means coupled to said counting means for indicating or recording the count output given by said counting means as the value-ranking of the sum read out to said second register with respect to all sums stored in said first register; and control means coupled to said first and second shift registers for causing selected sums to be shifted from said first shift register to said second shift register for indicating or recording the value-ranking of the selected sums of the remaining sums in said first register by conducting the same operations as aforesaid.

* * * * *